United States Patent
Kahn (10) Patent No.: US 11,514,800 B2
(45) Date of Patent: *Nov. 29, 2022

(54) SYSTEM AND METHODS FOR MONITORING UNMANNED TRAFFIC MANAGEMENT INFRASTRUCTURE

(71) Applicant: AVEOPT, INC., Traverse City, MI (US)

(72) Inventor: Arthur Kahn, Traverse City, MI (US)

(73) Assignee: Aveopt, Inc., Traverse City, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/680,562

(22) Filed: Feb. 25, 2022

(65) Prior Publication Data

US 2022/0189321 A1    Jun. 16, 2022

Related U.S. Application Data

(63) Continuation of application No. 16/707,682, filed on Dec. 9, 2019, now Pat. No. 11,288,970.

(Continued)

(51) Int. Cl.
*G08G 5/00* (2006.01)
*B64F 5/60* (2017.01)
(Continued)

(52) U.S. Cl.
CPC ......... *G08G 5/0043* (2013.01); *B64C 39/024* (2013.01); *G01S 13/91* (2013.01);
(Continued)

(58) Field of Classification Search
CPC .. B64C 39/024; G08G 5/0039; G08G 5/0026; G08G 5/0043; H01Q 3/08; H01Q 1/1257;
(Continued)

(56) References Cited

U.S. PATENT DOCUMENTS 7,809,496 B2 * 10/2010 Johansson ............ G08G 5/0026
                                                    701/117
3,064,347 A1    11/2011 Dietz
(Continued)

FOREIGN PATENT DOCUMENTS

CN        106454904 A  *  2/2017  ........ H04W 36/0083
JP       2008117423 A  *  5/2008  ............ B60R 21/00
(Continued)

OTHER PUBLICATIONS

International Search Report & Written Opinion dated Jun. 22, 2020 (13 pages).
(Continued)

*Primary Examiner* — Yuri Kan
(74) *Attorney, Agent, or Firm* — Butzel Long; Donald J. Lecher (57) ABSTRACT

A system and method for reliably and efficiently monitoring and arbitrating the performance of one or more UTM infrastructure systems are provided herein. The method for monitoring and arbitrating a plurality of UTM infrastructure networks involves monitoring and arbitrating a plurality of unmanned traffic management (UTM) infrastructure networks comprising integrating a UTM arbitration system between the plurality of UTM infrastructure networks, wherein the UTM arbitration system is operably configured to simultaneously monitor the UTM infrastructure networks; monitoring information and/or data associated with one or more UTM systems associated with the UTM infrastructure networks; detecting the presence or absence thereof of one or more inconsistencies in the data and/or information associated with the one or more UTM systems; and initiating a reconciliation activity in response to detecting the presence of at least one inconsistency in the data and/or information associated with the one or more UTM systems.

15 Claims, 3 Drawing Sheets

Related U.S. Application Data (60) Provisional application No. 62/808,496, filed on Feb. 21, 2019.

(51) Int. Cl.

| | | |
|---|---|---|
| *G06F 19/00* | (2018.01) | |
| *H04B 7/185* | (2006.01) | |
| *H04W 36/30* | (2009.01) | |
| *H04W 36/14* | (2009.01) | |
| *G05D 1/10* | (2006.01) | |
| *G01S 13/91* | (2006.01) | |
| *B64C 39/02* | (2006.01) | |
| *G08G 5/04* | (2006.01) | |

(52) U.S. Cl.
CPC ......... *G05D 1/1062* (2019.05); *G05D 1/1064* (2019.05); *G08G 5/0039* (2013.01); *G08G 5/0082* (2013.01); *G08G 5/0091* (2013.01); *G08G 5/045* (2013.01); *H04B 7/18508* (2013.01); *H04W 36/14* (2013.01); *H04W 36/305* (2018.08); *B64C 2201/146* (2013.01)

(58) Field of Classification Search
CPC .............. B61L 27/005; H04B 7/18504; H04B 7/18508; B64F 5/60; B60R 21/00; G06F 19/00

See application file for complete search history.

(56) References Cited

U.S. PATENT DOCUMENTS

| | | | |
|---|---|---|---|
| 9,565,625 B1 | 2/2017 | Macneille | |
| 9,694,902 B2 | 7/2017 | Guillet | |
| 10,312,994 B2 | 6/2019 | Priest | |
| 10,460,611 B2 | 10/2019 | Kotecha | |
| 11,288,970 B2 * | 3/2022 | Kahn | H04B 7/18508 |
| 2011/0222426 A1 * | 9/2011 | Chazel | B61L 27/0005 370/252 |
| 2016/0070261 A1 | 3/2016 | Heilman | |
| 2016/0071419 A1 | 3/2016 | Heilman | |
| 2016/0073378 A1 | 3/2016 | Wang | |
| 2016/0273921 A1 | 9/2016 | Zhou | |
| 2016/0300493 A1 * | 10/2016 | Ubhi | B64C 39/024 |
| 2017/0069214 A1 * | 3/2017 | Dupray | H04B 7/18504 |
| 2018/0017973 A1 | 1/2018 | Teague | |
| 2018/0047294 A1 | 2/2018 | Esposito | |
| 2018/0074520 A1 | 3/2018 | Liu | |
| 2018/0190132 A1 | 7/2018 | Cronkhite | |
| 2018/0275654 A1 | 9/2018 | Merz | |
| 2018/0320545 A1 | 11/2018 | Dardona | |
| 2018/0373269 A1 | 12/2018 | Cantrell | |
| 2019/0235500 A1 | 8/2019 | O'Brien | |
| 2019/0235502 A1 | 8/2019 | Lindsey | |
| 2019/0325760 A1 | 10/2019 | Priest | |
| 2019/0347874 A1 | 11/2019 | Mash | |
| 2020/0180791 A1 * | 6/2020 | Kimberly | B64F 5/60 |
| 2020/0351901 A1 | 11/2020 | Kahn | |

FOREIGN PATENT DOCUMENTS

| | | | | |
|---|---|---|---|---|
| KR | 20070060630 A | * | 6/2007 | .......... H01Q 1/1257 |
| WO | 2014196925 A1 | | 12/2014 | |
| WO | 2015175055 A2 | | 11/2015 | |

OTHER PUBLICATIONS

International Preliminary Report on Patentability for App. No. PCT/US2020/018566, dated Sep. 2, 2020, 9 pages.

International Search Report and Written Opinion for App. No. PCT/US2021/042144, dated Oct. 21, 2021, 10 pages.

Extended European Search Report issued in App. No. EP20759854, dated Oct. 20, 2022, 11 pages.

* cited by examiner

SYSTEM AND METHODS FOR MONITORING UNMANNED TRAFFIC MANAGEMENT INFRASTRUCTURE

CROSS-REFERENCE TO RELATED APPLICATION

This application claims priority to U.S. Provisional Application No. 62/808,496, filed on Feb. 21, 2019 and which is hereby incorporated by reference in its entirety.

FIELD OF THE DISCLOSURE

The present disclosure relates to systems and methods for monitoring and arbitrating unmanned aerial vehicle traffic management (UTM) infrastructure networks.

BACKGROUND OF THE DISCLOSURE

The rapid proliferation of unmanned aircraft systems (UAS's) necessitates systems and methods suitable for the integration of such systems into shared airspace. One of the most critical challenges associated with integration of small UAS's into shared airspace is effective unmanned traffic management (UTM). Currently, there are many limitations in the infrastructure used to enable and safely manage the widespread use of UAS's, regardless of the type of UAS. The size and altitude of many UAS's are such that traditional air traffic control systems, such as surveillance radar, are inappropriate. Radar technologies have difficulties monitoring UAS traffic at low altitudes, particularly when there are obstructions. As a result, other' types of infrastructure networks, such as wireless and SATCOM, are used with radar to ensure appropriate levels of coverage.

Conventional UTM systems, such as flight plans, address vehicle tracking via flight plans, Internet of Things input, etc. However, these solutions are dependent upon the wireless infrastructure network for operation, which presents limitations. First, the wireless infrastructure network is often deficient in its effectiveness in supporting normal use due to geographic and terrain issues, inability to meet current and growing capacity needs, weather conditions, etc. We all have experienced loss of signal for various reasons. Wireless infrastructure alone is not adequate to enable tracking of huge populations of UAS's that will be in operation. This results in a loss of signal and degradation of performance as UAS's move from one location through another.

Consequently, there is a need for a reliable and effective solution for monitoring and arbitrating the performance of UTM infrastructure systems.

SUMMARY OF THE DISCLOSURE

A system and methods for reliably and efficiently monitoring and arbitrating the performance of one or more UTM infrastructure system are provided herein.

In an exemplary embodiment, the method for monitoring and arbitrating a plurality of UTM infrastructure networks involves monitoring and arbitrating a plurality of unmanned traffic management (UTM) infrastructure networks comprising integrating a UTM arbitration system between the plurality of UTM infrastructure networks, wherein the UTM arbitration system is operably configured to simultaneously monitor the UTM infrastructure networks; monitoring information and/or data associated with one or more UTM systems associated with the UTM infrastructure networks; detecting the presence or absence thereof of one or more inconsistencies in the data and/or information associated with the one or more UTM systems; initiating a reconciliation activity in response to detecting the presence of at least one inconsistency in the data and/or information associated with the one or more UTM systems; identifying a secondary infrastructure network as the primary source for tracking one or more unmanned aerial systems (UAS's) in the one or more UTM systems when a reconciliation activity has been initiated; generating a correction action for the one or more UAS's in the one or more UTM systems; monitoring the performance of the plurality of the primary infrastructure network and the secondary infrastructure network in the one or more UTM systems to determine when primary function may be returned to the primary infrastructure network; and returning primary function to the primary infrastructure network.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

In the following detailed description, numerous specific details are set forth in order to provide a thorough understanding of the examples as defined in the claimed subject matter, and as an example of how to make and use the examples described herein. However, it will be understood by those skilled in the art that claimed subject matter is not intended to be limited to such specific details, and may even be practiced without requiring such specific details. In other instances, well-known methods, procedures, and ingredients have not been described in detail so as not to obscure the invention defined by the claimed subject matter. Some portions of the detailed description that follow are presented in terms of algorithms and/or symbolic representations of operations on data bits and/or binary digital signals stored within a computing system, such as within a computer and/or computing system memory. An algorithm is here and generally considered to be a self-consistent sequence of operations and/or similar processing leading to a desired result. The operations and/or processing may take the form of electrical and/or magnetic signals configured to be stored, transferred, combined, compared and/or otherwise manipulated, It has proven convenient at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device that manipulates and/or transforms data represented as physical electronic and/or magnetic quantities and/or other physical quantities within the computing platform's processors, memories, registers, and/or other information storage, transmission, and/or display devices.

Unless specifically stated otherwise, as apparent from the following discussion, it is appreciated that throughout this specification a computing platform includes, but is not limited to, a device such as a computer or a similar electronic computing device that manipulates and/or transforms data represented by physical, electronic, and/or magnetic quantities and/or other physical quantities within the computing platform's processors, memories, registers, and/or other information storage, transmission, reception and/or display devices. Accordingly, a computing platform refers to a system, a device, and/or a logical construct that includes the ability to process and/or store data in the form of signals. Thus, a computing platform, in this context, may comprise hardware, software, firmware and/or any combination thereof. Where it is described that a user instructs a computing platform to perform a certain action, it is understood that "instructs" may mean to direct or cause to perform a task as a result of a selection or action by a user. A user may, for example, instruct a computing platform embark upon a course of action via an indication of a selection, including, for example, pushing a key, clicking a mouse, maneuvering a pointer, touching a touch pad, touching a touch screen, acting out touch screen gesturing movements, maneuvering an electronic pen device over a screen, verbalizing voice commands, and/or by audible sounds. A user may include an end-user.

Flowcharts, also referred to as flow diagrams by some, are used in some figures herein to illustrate certain aspects of some examples. Logic they illustrate is not intended to be exhaustive of any, all, or even most possibilities. Their purpose is to help facilitate an understanding of this disclosure with regard to the particular matters disclosed herein. To this end, many well-known techniques and design choices are not repeated herein so as not to obscure the teachings of this disclosure.

Throughout this specification, the term "system" may, depending at least in part upon the particular context, be understood to include any method, process, apparatus, and/or other patentable subject matter that implements the subject matter disclosed herein. The subject matter described herein may be implemented in software, in combination with hardware and/or firmware. For example, the subject matter described herein may be implemented in software executed by a hardware processor.

Provided herein are methods and systems that enable reliable and effective monitoring, tracking, and arbitrating UTM infrastructure systems via a UTM arbitration system (UPAS) for UAS's. The UTM arbitration system may provide one or more services such as monitoring connectivity between unmanned aerial vehicles (UAV's) and UTM infrastructure systems for various purposes, such as tracking the positioning of the UAV relative to its location (e.g., latitude, longitude, elevation) and the location of other unmanned aerial vehicles; monitoring UTM infrastructure systems (e.g., wireless, radar, satellite), such as UTM flight plan management systems, for any differences/discrepancies between various UTM infrastructure systems and for performance levels and performance degradation of the UTM infrastructure systems. The UPAS way also switch from using a primary UTM infrastructure system to using a secondary/backup UTM infrastructure system in response to the measured performance levels of the UTM infrastructure systems.

Figure 1:
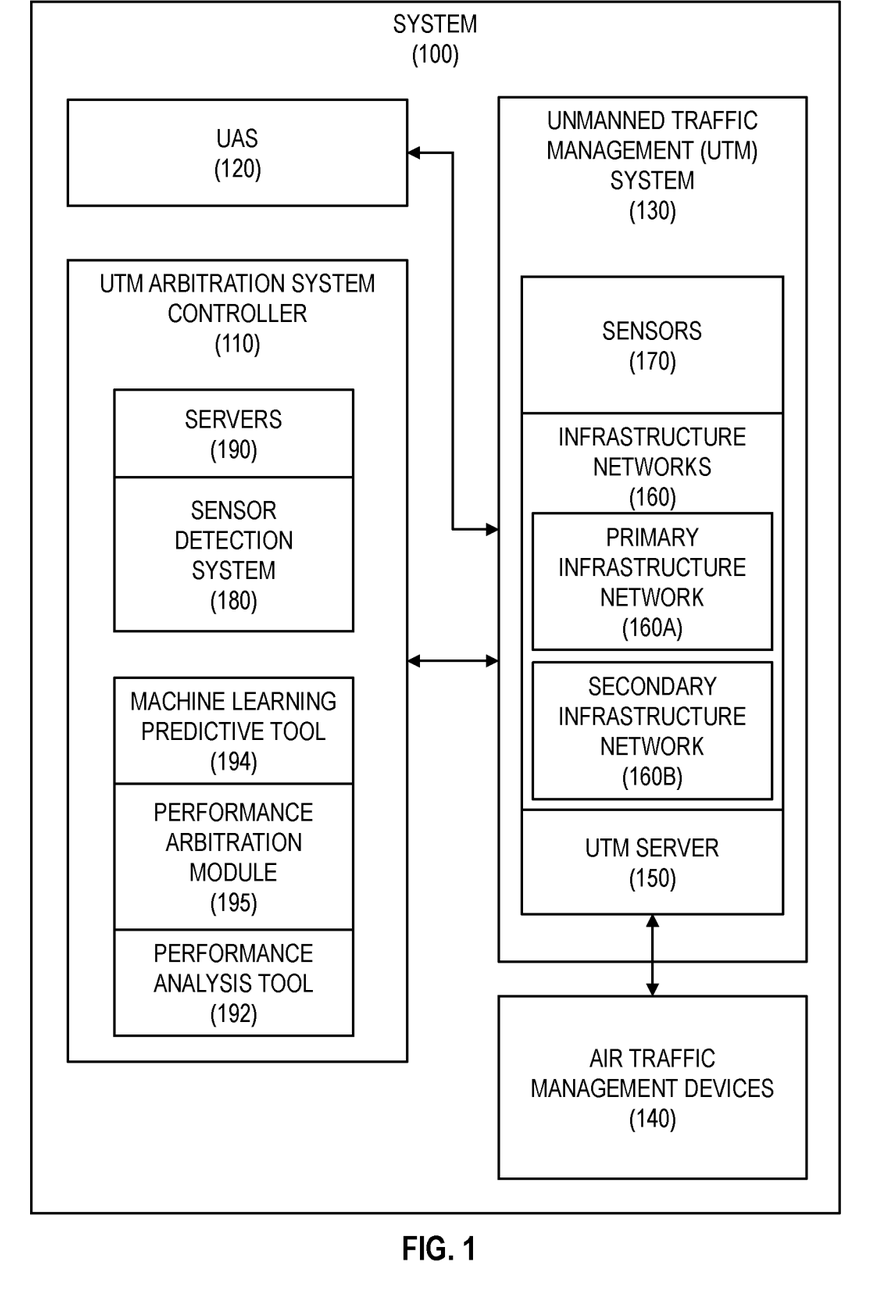
FIG. 1 is a schematic view of an exemplary system for monitoring and arbitrating UTM infrastructure networks.

Referring to FIG. 1, FIG. 1 shows a schematic view of an exemplary system 100 for monitoring and arbitrating UTM infrastructure networks. The system 100 includes a UTM arbitration system 110, one or more UAS's 120, a UTM system 130, and one or more infrastructure networks 160. The UTM arbitration system 110 includes one or more UPAS servers 190. The one or more UPAS servers 190 may be computing devices, such as, but not limited to computer, a tablet, a desktop, a laptop, a smartphone, a watch, or other device capable of communicating with the UPAS server 190.

In an embodiment, the UTM arbitration system 110 also includes a sensor detection system 180 operably configured to detect one or more sensors 170 positioned on one or more infrastructure networks 160.

As best shown in FIG. 1 and as a non-limiting example, the UTM arbitration system 110 also includes a performance analysis tool 192 and a machine learning predictive tool 194, which is operably configured to build a library of infrastructure performance against recorded conditions (i.e., weather, time of day, geographic/terrain conditions, etc.) and subsequently use that information as part of its analytics functionality supporting assessment and arbitration. The performance analysis tool 192 is operably configured to monitor the performance of the one or more infrastructure networks 160.

Figure 3:
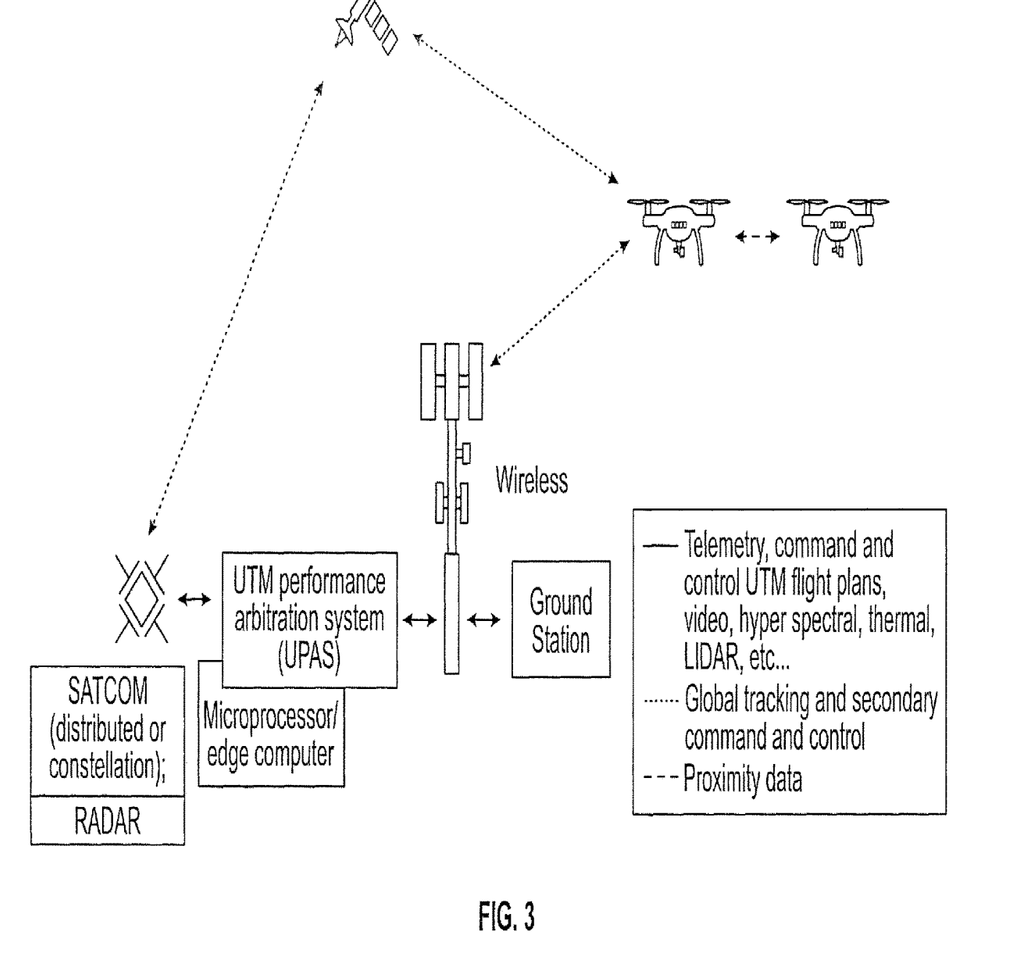
FIG. 3 is a schematic view of another exemplary system for monitoring and arbitrating UTM infrastructure networks.

The UTM system 130 may be any known UTM system and may include one or more UTM servers 150 in communication with the one or more UAS's 120 via the one or more infrastructure networks 160. The one or more UTM servers 150 may be a computing device, such as, but not limited to computer, a tablet, a desktop, a laptop, a smartphone, a watch, or other device capable of communicating with the UTM server 150. In an embodiment, the one or more sensors 170 may be integrated within the one or more infrastructure networks 160. As best shown in FIGS. 1 and 3, in some embodiments, the one or more infrastructure networks 160 may be a radar infrastructure network, a satellite communication (SATCOM) infrastructure network, a wireless network (e.g., cellular telephone network, the Internet or a local area network), and/or any combination thereof. Non-limiting examples of the SATCOM infrastructure network are a distributed SATCOM infrastructure network and a constellation SATCOM infrastructure network. In yet other embodiments, other forms of communications may be used such as wired and wireless telecommunication channels.

As best shown in FIGS. 1 and 3, the one or more UTM servers 150 may communicate with one or more air traffic management devices 140, such as ground control, via the infrastructure networks 160. The one or more UTM servers 150 of the UTM system 130 may be configured to authorize a flight, coordinate the flight continuously throughout the flight, enable real-time communication with the one or more air traffic management devices 140, and maintain a database of active UAS's 120.

The one or more UAS's 120 may comprise any unmanned vehicle purposed for flight, including for example, UAV's, unmanned aircraft devices, and small unmanned aircraft systems (sUAS's). The UTM system 130 may be configured to receive data from the one or more UAS's 120. In non-limiting examples, the data may be flight data and/or position data, such as current position, speed, and the like. Non-limiting examples of the flight data may be data related to an anticipated flight of the UAS 120, a flight purpose, a current location, a flight path/pattern, a flight area, a flight time, a flight duration, and/or combinations thereof.

The one or more infrastructure networks 160 may either be one or more primary infrastructure networks 160A or one or more secondary infrastructure networks 160B in the UTM system 130. The one or more primary infrastructure networks 160A refer to the main/original infrastructure networks configured to manage the uses of the one or more UAS's 120. The one or more secondary infrastructure networks 160B refer to the backup infrastructure networks configured to manage the uses of the one or more UAS's 120 under specific circumstances.

In an embodiment, the UTM arbitration system 110 communicates, with the one or more infrastructure networks 160, via the one or more sensors 170. The UTM arbitration system 110 is operably configured to monitor the performance of the one or more infrastructure networks 160. The one or more infrastructure networks 160 may be monitored simultaneously and in real-time.

Figure 2:
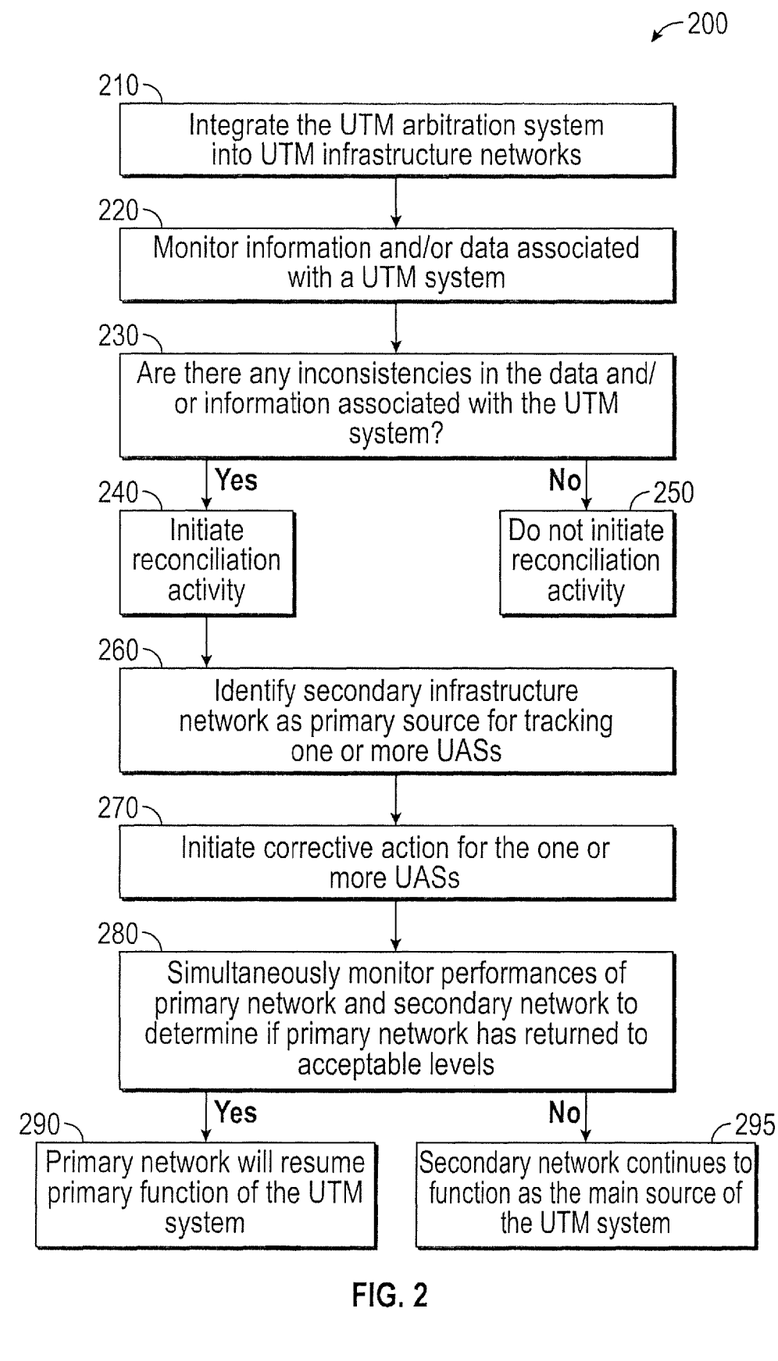
FIG. 2 is a flowchart of an exemplary method for monitoring and arbitrating UTM infrastructure networks using the system of FIG. 1.

Referring to FIG. 2, FIG. 2 shows a flowchart of an exemplary method 200 for monitoring and arbitrating UTM infrastructure networks. As shown in block 210, the method 200 begins when the UTM arbitration system 110 integrates with each of the one or more infrastructure networks 160 of the UTM system 130 to enable simultaneous monitoring of the one or more infrastructure networks 160. In a non-limiting example, the one or more infrastructure networks 160 are the wireless infrastructure network and one of the SATCOM infrastructure network or the radar infrastructure network, which may be known as a hybrid infrastructure network.

In an embodiment, integration of the UTM arbitration system 110 into one or more of the infrastructure networks 160 involves physically housing the UTM arbitration system 110 in one or more of the infrastructure networks 160. Also, one or more API's in the infrastructure network 160 and in external systems, such as those available via the Internet, may be used in the system 100 to allow for integration between the UTM arbitration system 110 and the infrastructure network 160, such as a hybrid infrastructure network.

In an embodiment, the UTM arbitration system 110 integrates with external systems via the primary infrastructure network 160A to enable monitoring of various parameters in the UTM system 130, including but not limited to flight plans, vehicle identification, and/or vehicle-to-vehicle proximity tracking. Non-limiting examples of the external systems are asset management software, Internet of things, and weather updates.

Once the UTM arbitration system 110 has integrated with the one or more infrastructure networks 160, the UTM arbitration system 110 monitors information and/or data associated with the UTM system 130, as shown in block 220. The one or more UPAS servers 190 process and analyze this information and/or data in real-time using algorithms, such as analytical and machine learning algorithms, in order to determine if there are any inconsistencies across different components of the UTM system 130. This is done to assess the performance of the one or more infrastructure networks 160. In some embodiments, some of the components analyzed in the UTM system 130 are flights plans versus physical vehicle tracking/positioning, versus vehicle-to-vehicle connectivity, versus weather conditions reports and forecasts. A non-limiting example of such a component is a notification of change in a flight plan that would account for differences in plan versus vehicle tracking.

With regard to the one or more infrastructure networks 160, the one or more UPAS servers 190 analyze data and/or information associated with the primary infrastructure network 160A as compared with data and/or information associated with the secondary infrastructure network 160B. This may include monitoring the continuity of the signal, the coverage, and any latency issues related to the one or more infrastructure networks 160. In a non-limiting example, the UTM arbitration system 110 may have an integration protocol to monitor the state of integration with the one or more infrastructure networks 160.

As shown in block 230, the UTM arbitration system 110 determines whether there are inconsistencies in the data and/or information between information sources, other than between the primary infrastructure network 160A and the secondary infrastructure network 160B. If there are one or more inconsistencies, the UTM arbitration system 110 initiates a reconciliation activity, as shown in block 240. In an embodiment, the reconciliation activity may be defined based upon weighting and probability modeling applied against data and/or information acquired and processed from various disparate sources. While the reconciliation activities are occurring, the primary tracking functions for the UTM system 130 may be transferred from the primary infrastructure network 160A to the secondary infrastructure network 160B.

If the UTM arbitration system 110 does not find any inconsistencies in the data and/or information between information sources, the UTM arbitration system 110 will not initiate reconciliation activity, as shown in block 250.

If the UTM arbitration system 110 determines that the inconsistencies in the data/information emanate from the primary infrastructure network 160A, the UTM arbitration system 110 identifies the secondary infrastructure networks 160B as the primary source for tracking the one or more UAS's 120, as shown in block 260. The inconsistencies in the primary infrastructure network 160A may originate from the degradation of the primary infrastructure network 160A beyond predetermined acceptable levels or from interruptions in the performance of the primary infrastructure network 160A. In a non-limiting example, the wireless infrastructure network is the original primary network 160A and the SATCOM and radar networks are the original secondary infrastructure networks 160B. Some of the data and/or information analyzed by the one or more UPAS servers 190 of the UTM arbitration system 110 when deciding whether to transition to a secondary/backup infrastructure network are associated with the positioning of the one or more UAS's 120 in the environment, vehicle proximity monitoring (i.e., collision avoidance), and the capacity of the wireless network.

Non-limiting examples of tracking performance of the UTM system 130 through positioning discrepancies include the following:

Primary infrastructure network 160A (i.e. wireless network) versus the original secondary infrastructure networks 160B (i.e., SATCOM or radar networks) by comparing tracking/positioning data to data from sources;

The one or more infrastructure networks 160 versus the Internet of Things based on filed flight plans in the UTM system 130 from secondary sources;

The one or more UAS's 120 versus the one or more infrastructure networks 160 versus the Internet of Things based on data from other sources; and Vehicle versus vehicle proximity position.

In an embodiment, if the UTM arbitration system 110 identifies inconsistencies in the data and/or information between the primary network 160A and the secondary network 160B of the UTM system 130, the UTM arbitration system 110 may initiate a corrective action, such as a flight holding pattern for the one or more UAS's 120 in the environment, as shown in block 270. The flight holding pattern may be executed through integration between the flight control of the one or more UAS's 120 and the UTM arbitration system 110. The flight holding pattern may then be maintained until the discrepancies are reconciled and appropriate corrective action is taken.

The UTM arbitration system 110, via the performance analysis tool 192, may then simultaneously monitor performances of the original primary network 160A and the secondary network 160B of the UTM system 130 to determine whether it is safe for the UTM system 130 to return primary function to the primary network 160A, as shown in block 280. In an embodiment, if the UTM arbitration system 110 determines that the performance of the primary network 160A has returned to predetermined acceptable levels for a predetermined amount of time and that the performance degradation of the primary network 160A was the result of external forces, such as weather, the primary network 160A will resume primary function of the UTM system 130, as shown in block 290.

In an embodiment, if the UTM arbitration system 110 determines that the performance of the primary network 160A has not returned to predetermined acceptable levels for a predetermined amount of time or that the performance degradation of the primary network 160A was not the result of external forces, the secondary network 160E will continue to function as the main source for the UTM system 130, as shown in block 295.

Depending on the type and amount of discrepancies identified by the UTM arbitration system 110, non-limiting examples of corrective action may include the following:

Switching from the primary infrastructure network 160A (i.e., wireless network) versus the original secondary infrastructure networks 160B (i.e., SATCOM or radar networks) based on performance of the primary infrastructure network 160A, with the ability to switch back to the primary infrastructure network 160A upon performance improvement;

Modifying flight plans in the UTM system 130 based on discrepancies and/or needed flight corrections and results; and Disabling or modifying vehicle-to-vehicle collision avoidance to extend the distance between vehicles relative to the action avoidance being required.

In some examples, arbitration using the UTM arbitration system 110 between discrepant sources of data is first based on consistent data across a majority of data sources. In the event that there is no majority among data sources, discrepancy reconciliation may be determined based upon the following, listed from most important:

Analytics performed against specific data sets with consideration given to various variables including but not limited to weighting factors for the data, probability algorithms, etc.;

V2X; refers to Vehicle connectivity in the context of the Internet or as is referred to in the connectivity industry "Vehicle to Everything." This would include external sources of information/data acquired from the Internet such as weather conditions, power outages (rolling or otherwise), Asset Management Systems relative to the infrastructure (scheduled and unscheduled maintenance, etc.;

The one or more infrastructure networks 160; and

Vehicle-to-vehicle proximity positioning.

In certain embodiments, the system 100 has a sensor detection system 180 that includes a sensor subsystem comprising a plurality of sensors 170 for determining signal performance between an unmanned aerial vehicle (UAV) 120 and a wireless communication infrastructure (e.g., cellular telephone infrastructure) and between the UAV and a satellite communications infrastructure. System 100 also includes a controller or UTM arbitration system controller 110 having a computing device (e.g., performance analysis tool 192) that receives signals from the sensor subsystem 170, and a performance arbitration module 195 for switching between tracking and communicating with the unmanned aerial vehicle 120 using wireless infrastructure or satellite communications infrastructure depending on relative performance criteria for the communications infrastructure. The sensor subsystem 170 may include a plurality of signal strength meters, signal latency detection calculators, and/or other sensors or modules for characterizing signal performance. The UTM arbitration system controller 110 can be configured to switch tracking of (and/or communication with) the UAV 120 from either communication infrastructure to the other when a loss of connectivity is detected. The UTM arbitration system controller 110 can be configured to instruct the UAV 120 to remain in a holding pattern when performance criteria for both communication infrastructures are below a threshold value. The UTM arbitration system controller 110 can be configured to switch from the satellite communication infrastructure to the Wireless communication infrastructure for the UAV 120 whenever the performance criteria for the wireless communication infrastructure exceeds a threshold value. The UTM arbitration system controller 110 can be configured to track the UAV 120 with radar infrastructure when both communications infrastructure have degraded below a predetermined threshold value. The UTM arbitration system controller 110 can be configured to evaluate the magnitude of a deviation in actual flight path of a particular UAV 120 from a predetermined flight plan for that UAV, and provide corrective instructions to that particular UAV 120. The UTM arbitration system controller 110 can be configured to monitor UAV 120 flight paths for potential proximity encroachment and reroute at least one of the UAVs to avoid proximity encroachment. The UAV 120 can be configured to maintain a holding pattern when there is a loss of connectivity between the UAV 120 and both of the communications infrastructures. The system 100 can be configured to build a library of infrastructure performance against recorded conditions, and use that library to predict communications infrastructure degradation along a planned flight path and modify the flight plan to avoid loss of connectivity or communications infrastructure degradation. The system 100 can be configured to monitor weather conditions along a planned flight path and modify the flight plan to avoid loss of connectivity or communications degradation.

In certain aspects of the disclosure, a method includes establishing communication between a UAV and wireless communication infrastructure; establishing communication between the UAV and satellite communication infrastructure; providing a controller that evaluates signal availability, latency and performance for communication between the UAV and the wireless communication infrastructure and between the UAV and the satellite communication infrastructure; tracking and controlling the UAV via the wireless communication infrastructure when a signal is available from the wireless communication infrastructure and the latency and performance of the wireless signal exceeds a predetermined acceptable threshold; switching to tracking and controlling the UAV via the satellite communication infrastructure when a signal is not available from the wireless communications infrastructure or the latency or performance of the signal from the wireless communication infrastructure is below a predetermined threshold; and switching back to tracking and controlling the UAV via the wireless communication infrastructure when a signal is available and the latency and performance of the signal from the wireless communication infrastructure exceeds the predetermined acceptable threshold.

The present methods and system may be operational with other general purpose or special purpose computing system environments or configuration. Examples of well-known computing systems, environments, and/or configurations that can be suitable for use with the methods and system comprise, but are not limited to, personal computers, server computers, laptop devices, multiprocessor systems, and the like.

The computing device disclosed herein may comprise one or more processors, a system memory, and a bus that couples various components of the computer to the system memory. The computing device may comprise a variety of computer readable media, such as removable and non-removable media. The system memory can comprise computer readable media in the form of volatile memory, such as RAM, and/or non-volatile memory, such as read-only memory. The methods and system may employ artificial intelligence techniques such as machine learning and iterative learning.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to form the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. An Unmanned Traffic Management (UTM) arbitration system comprising:
    a computing device including a processor and a memory configured to store instructions configured to be executed by the processor;
    a sensor detection system in communication with the computing device and configured to receive sensor signals from an unmanned traffic management system; and
    a performance arbitration module in communication with the computing device and configured to track, monitor performance data of and communicate with an unmanned vehicle being managed by and received through the unmanned traffic management system,
    wherein the UTM arbitration system is configured
        to bi-directionally communicate with the unmanned traffic management system,
        to track, monitor and communicate with the unmanned vehicle through at least one infrastructure network being managed by the unmanned traffic management system,
        to detect one of a position tracking discrepancy condition, a signal performance condition, a vehicle proximity condition, and an external condition, wherein each condition causes a discrepancy of performance of the unmanned vehicle being managed by the unmanned traffic management system, and
        to initiate a reconciliation activity, based on the step of detecting, the reconciliation activity configured to reconcile the discrepancy of performance of the unmanned vehicle being managed by the unmanned traffic management system.

2. The UTM arbitration system according to claim 1, wherein the performance arbitration module is further configured to track a position of the unmanned vehicle relative to a physical location.

3. The UTM arbitration system according to claim 1, wherein the performance arbitration module is further configured to monitor the performance data of the unmanned vehicle including communication performance data between the unmanned vehicle and the at least one infrastructure network.

4. The UTM arbitration system according to claim 3, wherein the communication performance data between the unmanned vehicle and at least one of the infrastructure network is stored as a library of infrastructure performance data including at least one of an external condition, a time of day, a geographic condition and a terrain condition.

5. The UTM arbitration system according to claim 1, wherein the reconciliation activity configured to affect the performance of the unmanned vehicle includes modifying a travel plan of the unmanned vehicle in the unmanned traffic management system.

6. The UTM arbitration system according to claim 1, wherein the reconciliation activity configured to affect the performance of the unmanned vehicle includes one of disabling or modifying a vehicle-to-vehicle collision avoidance function of the unmanned vehicle.

7. An Unmanned Traffic Management (UTM) arbitration system comprising:
    a computing device including a processor and a memory configured to store instructions configured to be executed by the processor;
    a sensor detection system in communication with the computing device and configured to receive sensor signals from an unmanned traffic management system; and
    a performance arbitration module in communication with the computing device and configured to track, monitor performance data of and communicate with an unmanned vehicle being managed by and received through the unmanned traffic management system,
    wherein the UTM arbitration system is configured
        to build a library of infrastructure network performance by monitoring at least one infrastructure network in communication with the unmanned vehicle with respect to at least one recorded condition related to a travel plan of the unmanned vehicle being managed by the unmanned traffic management system,
        to predict, by use of the library of infrastructure network performance, communication degradation of the at least one infrastructure network one of in communication with the unmanned vehicle or proposed to be in communication with the unmanned vehicle based on the travel plan, and provide the predicted communication degradation as analytic data to support assessment of communication issues and arbitration to avoid potential communication degradation between the unmanned vehicle and the unmanned traffic management system.

8. The UTM arbitration system according to claim 7, wherein the UTM arbitration system is further configured to modify the travel plan of the unmanned vehicle based on the predicted communication degradation configured to the avoid potential communication degradation between the unmanned vehicle and the unmanned traffic management system.

9. The UTM arbitration system according to claim 7, wherein the recorded condition comprises at least one of an external condition, a time of day, a geographic condition, a terrain condition, a power outage status and an asset management maintenance condition.

10. An Unmanned Traffic Management (UTM) arbitration system comprising:

a computing device including a processor and a memory configured to store instructions configured to be executed by the processor;

a sensor detection system in communication with the computing device and configured to receive sensor signals from an unmanned traffic management system; and a performance arbitration module in communication with the computing device and configured to track, monitor performance data of and communicate with an unmanned vehicle being managed by and received through the unmanned traffic management system, wherein the UTM arbitration system is configured to detect a communication degradation between the unmanned vehicle and at least one infrastructure network being managed by the unmanned traffic management system, and to modify, in response to detecting the communication degradation, a travel parameter of the unmanned vehicle to correct the communication degradation.

11. The UTM arbitration system according to claim 10, wherein the modified travel parameter of the unmanned vehicle comprises at least one of:

modifying the travel plan of the unmanned vehicle being managed by the unmanned traffic management system; and one of disabling or modifying a vehicle-to-vehicle collision avoidance function of the unmanned vehicle configured to change a distance parameter between unmanned vehicles.

12. An Unmanned Traffic Management (UTM) arbitration system comprising:

a computing device including a processor and a memory configured to store instructions configured to be executed by the processor;

a sensor detection system in communication with the computing device and configured to receive sensor signals from an unmanned traffic management system; and a performance arbitration module in communication with the computing device and configured to track, monitor performance data of and communicate with an unmanned vehicle being managed by and received through the unmanned traffic management system, wherein the UTM arbitration system is configured to determine a magnitude of a deviation between a travel plan managed by the unmanned traffic management system and a physical position the unmanned vehicle, and to provide corrective instructions to the unmanned vehicle in response to the determined magnitude of the deviation.

13. An Unmanned Traffic Management (UTM) arbitration system comprising:

a computing device including a processor and a memory configured to store instructions configured to be executed by the processor;

a sensor detection system in communication with the computing device and configured to receive sensor signals from an unmanned traffic management system; and a performance arbitration module in communication with the computing device and configured to track, monitor performance data of and communicate with an unmanned vehicle being managed by and received through the unmanned traffic management system, wherein the UTM arbitration system is configured to monitor an external condition from an external data source, the external condition related to a travel plan of the unmanned vehicle, the travel plan being managed by the unmanned traffic management system, and to modify, based on the monitored external condition, the travel plan of the unmanned vehicle.

14. The UTM arbitration system according to claim 13, wherein the monitored external condition includes one of an external condition report or an external condition forecast.

15. The UTM arbitration system according to claim 13, wherein the modified travel plan of the unmanned vehicle is configured to avoid one of a communication degradation or a loss of communication between the unmanned vehicle and at least one infrastructure network upon which the unmanned vehicle communicates with the traffic management system.

* * * * *